K. KESSLER.
LOCK NUT.
APPLICATION FILED DEC. 26, 1912.
1,073,497. Patented Sept. 16, 1913.
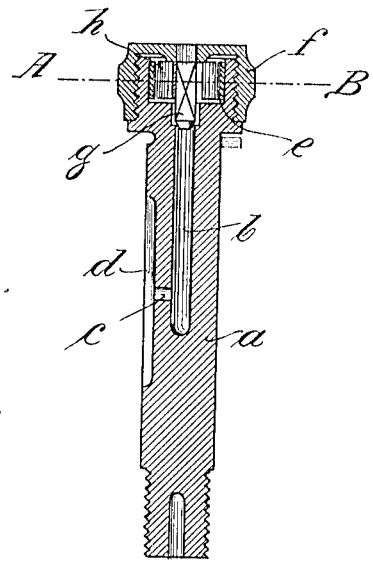
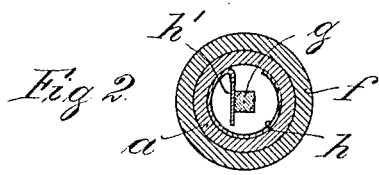
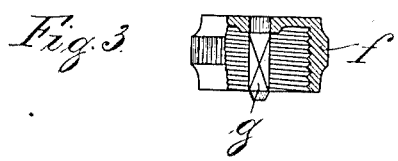
Witnesses:
Charles B Crompton
John A. Percival
Inventor.
Karl Kessler.
by Broydon Marks
Attorney

UNITED STATES PATENT OFFICE.

KARL KESSLER, OF WASSERALFINGEN, GERMANY.

LOCK-NUT.

1,073,497.  Specification of Letters Patent.  Patented Sept. 16, 1913.

Application filed December 26, 1912.  Serial No. 738,731.

*To all whom it may concern:*

Be it known that I, KARL KESSLER, subject of the King of Wurttemberg, residing at Wasseralfingen, Kingdom of Wurttemberg, Germany, have invented a certain new and Improved Lock-Nut, of which the following is a specification.

This invention relates to an improved means of locking screw-threaded caps upon bolts, spindles, lubricating axles and the like.

According to the present invention the screw-threaded end of the bolt, spindle or lubricating axle is provided with a recess in which is fitted a spring adapted to bear against the sides of a central pin of annular cross section projecting internally from the screw-threaded cap and riveted or otherwise secured thereto.

In order that my invention may be more clearly understood, reference is made to the accompanying drawings which show my improved locking means as applied by way of example to the axle cap of a lubricating axle.

Figure 1 is a sectional view through the axis of the axle, Fig. 2 is a cross section on the line A—B of Fig. 1, Fig. 3 is a partial sectional view of the axle cap.

The axle, spindle, bolt or the like $a$, which on the drawings is shown provided with a central passage $b$ communicating by way of an orifice $c$ with a lubricating groove $d$, is provided with a cylindrical recess $e$ at one end communicating with the central passage $b$. The screw-threaded cap $f$ is provided with an internally projecting central pin $g$ preferably square in cross section and riveted or otherwise secured to the cap. This pin $g$ is adapted when the axle cap is screwed in position, to bear against the inwardly turned end $h'$ of a blade spring $h$ which is bent circularly to fit frictionally within the recess $e$ but which may, if desired be otherwise secured in the recess.

It will be seen that when screwing the cap on or off the corners of the pin $g$ will depress the end of the spring $h'$ and that when the end $h'$ of the spring lies against one of the flat sides of the pin, the cap $f$ will be prevented from accidental rotation such as might be caused by vibration or the like.

I claim:—

1. In combination with a screw-threaded bolt or spindle having a recess in the end thereof, an internally screw-threaded cap adapted to be screwed thereon, an internally projecting central pin in said cap of angular cross-section, and a spring in said recess adapted to bear against the sides of said pin.

2. In combination with a screw-threaded bolt or spindle having a cylindrical recess in the end thereof, an internally screwed cap adapted to be screw-threaded thereon, an internally projecting central pin in said cap of angular cross-section, and a spring bent circularly to fit frictionally in said recess and having one end bent inwardly to bear against the sides of said pin.

In testimony whereof I have affixed my signature in presence of two witnesses.

KARL KESSLER.

Witnesses:
 ERNEST ENTENMANN,
 FRIDA KLAIBER.

Copies of this patent may be obtained for five cents each, by addressing the "Commissioner of Patents, Washington, D. C."